(12) United States Patent
Smith

(10) Patent No.: US 10,906,191 B2
(45) Date of Patent: Feb. 2, 2021

(54) HYBRID ROBOTIC END EFFECTOR

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

(*) Notice: Subject to any disclaimer, the term of this patent is extended or adjusted under 35 U.S.C. 154(b) by 0 days.

(21) Appl. No.: 16/237,619

(22) Filed: Dec. 31, 2018

(65) Prior Publication Data

US 2020/0206956 A1 Jul. 2, 2020

(51) Int. Cl.
| B25J 15/06 | (2006.01) |
| B25J 15/10 | (2006.01) |
| B25J 15/00 | (2006.01) |

(52) U.S. Cl.
CPC ....... B25J 15/0052 (2013.01); B25J 15/0608 (2013.01); B25J 15/103 (2013.01)

(58) Field of Classification Search
CPC .. B25J 15/0052; B25J 15/0608; B25J 15/103; B66C 1/04; B66C 1/06; Y10S 901/40
USPC ................... 294/65.5, 2, 3; 414/606
See application file for complete search history.

(56) References Cited

U.S. PATENT DOCUMENTS

| 1,880,138 A | 9/1932 | Franz |
| 2,850,189 A * | 9/1958 | Louis ........................ B66C 1/06 |
| | | 414/606 |
| 2,981,198 A | 4/1961 | Nettel |
| 3,171,549 A | 3/1965 | Orloff |
| 3,280,991 A | 10/1966 | Melton et al. |
| 3,306,646 A * | 2/1967 | Flora, Jr. .................. B66C 1/427 |
| | | 294/2 |
| 3,358,678 A | 12/1967 | Kulstar |
| 3,449,008 A | 6/1969 | Colechia |

(Continued)

FOREIGN PATENT DOCUMENTS

| CN | 101214653 A | 7/2008 |
| CN | 103610524 A | 3/2014 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — Dean J Kramer

(57) ABSTRACT

A robotic end-effector to provide magnetic and mechanical finger grip. The end-effector has one or more magnets coupled to a palm, each of the one or more magnets having a magnet face to magnetically attach to a ferromagnetic object. The magnet face(s) define(s) a magnetic engagement surface with the magnet and the palm disposed on a proximal side of the magnetic engagement surface. A finger is pivotally coupled to the palm to grip the ferromagnetic object or another object. The finger has a deployed configuration wherein the finger is disposed distally with respect to the magnetic engagement surface and opposes the palm or the magnet face to grip the ferromagnetic object or other object. The finger has a retracted configuration wherein the finger is disposed proximally with respect to the magnetic engagement surface along with the magnet and the palm, and wherein the magnet face forms an outermost contact surface.

30 Claims, 3 Drawing Sheets

(56) References Cited

U.S. PATENT DOCUMENTS

| | | | |
|---|---|---|---|
| 3,449,769 A | 6/1969 | Mizen | |
| 3,535,711 A | 10/1970 | Fick | |
| 3,759,563 A | 9/1973 | Kitamura | |
| 4,046,262 A | 9/1977 | Vykukal et al. | |
| 4,179,233 A | 12/1979 | Bromell et al. | |
| 4,200,596 A | 4/1980 | Iiyama et al. | |
| 4,251,791 A | 2/1981 | Yanagisawa et al. | |
| 4,398,110 A | 8/1983 | Flinchbaugh et al. | |
| 4,483,407 A | 11/1984 | Iwamoto et al. | |
| 4,567,417 A | 1/1986 | Francois et al. | |
| 4,575,297 A | 3/1986 | Richter | |
| 4,591,944 A | 5/1986 | Gravel | |
| 4,603,896 A * | 8/1986 | Vasseur | B65G 47/90 |
| | | | 294/119.1 |
| 4,661,032 A | 4/1987 | Arai | |
| 4,666,357 A | 5/1987 | Babbi | |
| 4,723,353 A | 2/1988 | Monforte | |
| 4,762,455 A | 8/1988 | Coughlan et al. | |
| 4,768,143 A | 8/1988 | Lane et al. | |
| 4,821,594 A | 4/1989 | Rosheim et al. | |
| 4,834,443 A | 5/1989 | Crowder et al. | |
| 4,853,874 A | 8/1989 | Iwamoto et al. | |
| 4,883,400 A | 11/1989 | Kuban et al. | |
| 4,884,720 A | 12/1989 | Whigham et al. | |
| 4,915,437 A | 4/1990 | Cherry | |
| 4,921,292 A | 5/1990 | Harwell et al. | |
| 4,997,095 A | 3/1991 | Jones et al. | |
| 5,004,391 A | 4/1991 | Burdea | |
| 5,038,089 A | 8/1991 | Szakaly | |
| 5,072,361 A | 12/1991 | Davis et al. | |
| 5,080,682 A | 1/1992 | Schectman | |
| 5,101,472 A | 3/1992 | Repperger | |
| 5,105,367 A | 4/1992 | Tsuchihashi et al. | |
| 5,117,814 A | 6/1992 | Luttrell et al. | |
| 5,144,943 A | 9/1992 | Luttrell et al. | |
| 5,172,951 A | 12/1992 | Jacobsen et al. | |
| 5,230,147 A | 7/1993 | Asaoka et al. | |
| 5,239,246 A | 8/1993 | Kim | |
| 5,246,216 A | 9/1993 | Oberst | |
| 5,280,981 A | 1/1994 | Schulz | |
| 5,282,460 A | 2/1994 | Boldt | |
| 5,328,224 A | 7/1994 | Jacobsen et al. | |
| 5,336,982 A | 8/1994 | Backes | |
| 5,389,849 A | 2/1995 | Asano et al. | |
| 5,399,951 A | 3/1995 | Lavallee et al. | |
| 5,516,249 A | 5/1996 | Brimhall | |
| 5,577,417 A | 11/1996 | Fournier | |
| 5,577,902 A | 11/1996 | Todo et al. | |
| 5,588,688 A | 12/1996 | Jacobsen et al. | |
| 5,664,636 A | 9/1997 | Ikuma et al. | |
| 5,704,945 A | 1/1998 | Wagner et al. | |
| 5,762,390 A | 6/1998 | Gosselin et al. | |
| 5,784,542 A | 7/1998 | Ohm et al. | |
| 5,785,505 A | 7/1998 | Price | |
| 5,797,615 A | 8/1998 | Murray | |
| 5,845,540 A | 12/1998 | Rosheim | |
| 5,865,770 A | 2/1999 | Schectman | |
| 5,898,599 A | 4/1999 | Massie et al. | |
| 5,912,658 A | 6/1999 | Bergamasco et al. | |
| 5,949,686 A | 9/1999 | Yoshinada et al. | |
| 5,957,981 A | 9/1999 | Gramnas | |
| 5,961,476 A | 10/1999 | Betto et al. | |
| 5,967,580 A | 10/1999 | Rosheim | |
| 5,994,864 A | 11/1999 | Inoue et al. | |
| 6,016,385 A | 1/2000 | Yee et al. | |
| 6,170,162 B1 | 1/2001 | Jacobsen et al. | |
| 6,202,013 B1 | 3/2001 | Anderson et al. | |
| 6,272,924 B1 | 8/2001 | Jansen | |
| 6,301,526 B1 | 10/2001 | Kim et al. | |
| 6,338,605 B1 | 1/2002 | Halverson et al. | |
| 6,340,065 B1 | 1/2002 | Harris | |
| 6,360,166 B1 | 3/2002 | Alster | |
| 6,394,731 B1 | 5/2002 | Konosu et al. | |
| 6,425,865 B1 | 7/2002 | Salcudean et al. | |
| 6,430,473 B1 | 8/2002 | Lee et al. | |
| 6,435,794 B1 | 8/2002 | Springer | |
| 6,507,163 B1 | 1/2003 | Allen | |
| 6,508,058 B1 | 1/2003 | Seaverson | |
| 6,554,342 B1 | 4/2003 | Burnett | |
| 6,641,371 B2 | 11/2003 | Graziani et al. | |
| 6,659,703 B1 | 12/2003 | Kirkley | |
| 6,659,939 B2 | 12/2003 | Moll et al. | |
| 6,663,154 B2 * | 12/2003 | Pancheri | B25J 15/0608 |
| | | | 294/65.5 |
| 6,714,839 B2 | 3/2004 | Salisbury, Jr. et al. | |
| 6,740,125 B2 | 5/2004 | Mosler | |
| 6,855,170 B2 | 2/2005 | Gramnas | |
| 7,168,748 B2 | 1/2007 | Townsend et al. | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,509,905 B2 | 3/2009 | Jacobsen et al. | |
| 7,628,766 B1 | 12/2009 | Kazerooni et al. | |
| 7,783,384 B2 | 8/2010 | Kraft | |
| 7,862,522 B1 | 1/2011 | Barclay et al. | |
| 7,862,524 B2 | 1/2011 | Carignan et al. | |
| 7,883,546 B2 | 2/2011 | Kazerooni et al. | |
| 7,947,004 B2 | 5/2011 | Kazerooni et al. | |
| 7,965,006 B2 | 6/2011 | Kang et al. | |
| 8,024,071 B2 | 9/2011 | Komatsu et al. | |
| 8,051,764 B2 | 11/2011 | Jacobsen et al. | |
| 8,100,451 B2 | 1/2012 | Okuda et al. | |
| 8,132,835 B2 * | 3/2012 | Ban | B25J 15/0616 |
| | | | 294/183 |
| 8,151,401 B2 | 4/2012 | Cheyne | |
| 8,182,010 B2 | 5/2012 | Lee et al. | |
| 8,245,728 B2 | 8/2012 | Jacobsen et al. | |
| 8,295,975 B2 | 10/2012 | Arimatsu et al. | |
| 8,375,982 B2 | 2/2013 | Gray, Jr. | |
| 8,435,309 B2 | 5/2013 | Gilbert et al. | |
| 8,452,447 B2 | 5/2013 | Nixon | |
| 8,473,101 B2 | 6/2013 | Summer | |
| 8,511,192 B2 | 8/2013 | Hirtt et al. | |
| 8,516,918 B2 | 8/2013 | Jacobsen et al. | |
| 8,529,582 B2 | 9/2013 | Devengenzo et al. | |
| 8,534,728 B1 | 9/2013 | Bosscher et al. | |
| 8,560,118 B2 | 10/2013 | Greer et al. | |
| 8,640,723 B2 | 2/2014 | Jacobsen et al. | |
| 8,667,643 B2 | 3/2014 | Simonelli et al. | |
| 8,672,378 B2 | 3/2014 | Yamasaki et al. | |
| 8,747,486 B2 | 6/2014 | Kawasaki et al. | |
| 8,794,262 B2 | 8/2014 | Jacobsen et al. | |
| 8,821,338 B2 | 9/2014 | Thorson | |
| 8,849,457 B2 | 9/2014 | Jacobsen et al. | |
| 8,870,967 B2 | 10/2014 | Herr et al. | |
| 8,881,616 B2 | 11/2014 | Dize et al. | |
| 8,888,864 B2 | 11/2014 | Iverson et al. | |
| 8,892,258 B2 | 11/2014 | Jacobsen et al. | |
| 8,920,517 B2 | 12/2014 | Smith et al. | |
| 8,942,846 B2 | 1/2015 | Jacobsen et al. | |
| 8,977,388 B2 | 3/2015 | Jacobsen et al. | |
| 8,977,398 B2 | 3/2015 | Jacobsen et al. | |
| 9,295,604 B2 | 3/2016 | Zoss et al. | |
| 9,314,921 B2 | 4/2016 | Jacobsen et al. | |
| 9,329,587 B2 | 5/2016 | Fudaba et al. | |
| 9,333,097 B2 | 5/2016 | Herr et al. | |
| 9,533,411 B2 | 1/2017 | Jacobsen et al. | |
| 9,616,580 B2 | 4/2017 | Smith et al. | |
| 9,643,323 B2 | 5/2017 | Nagatsuka et al. | |
| 9,727,076 B2 | 8/2017 | Smith et al. | |
| 9,789,603 B2 | 10/2017 | Jacobsen et al. | |
| 9,895,812 B2 | 2/2018 | Gonzalez et al. | |
| 10,028,844 B2 | 7/2018 | Cheng et al. | |
| 10,071,485 B2 | 9/2018 | Schiele et al. | |
| 10,216,177 B2 | 2/2019 | Gildert et al. | |
| 10,406,676 B2 | 9/2019 | Smith et al. | |
| 10,512,583 B2 | 12/2019 | Smith | |
| 10,533,542 B2 | 1/2020 | Smith et al. | |
| 10,566,914 B2 | 2/2020 | Fujita et al. | |
| 2001/0033146 A1 | 10/2001 | Kato et al. | |
| 2001/0043847 A1 | 11/2001 | Kramer | |
| 2002/0075233 A1 | 6/2002 | White et al. | |
| 2002/0094919 A1 | 7/2002 | Rennex et al. | |

(56) References Cited

U.S. PATENT DOCUMENTS

| | | |
|---|---|---|
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1* | 1/2004 | Love ................ B66C 1/06 294/3 |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1* | 3/2013 | Tsai ................ B66C 1/04 294/24 |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321340 A1 | 11/2015 | Smith |
| 2015/0321342 A1 | 11/2015 | Smith et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2017/0050310 A1 | 2/2017 | Kanaoka |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0290309 A1* | 10/2018 | Becker ................ B25J 15/0009 |
| 2018/0298976 A1 | 10/2018 | Battlogg |
| 2019/0176320 A1 | 6/2019 | Smith et al. |
| 2019/0184576 A1 | 6/2019 | Smith et al. |
| 2020/0001450 A1 | 1/2020 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 B1 | 10/2016 |
| FR | 2651220 A1 * | 3/1991 ............... B66C 1/06 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S60-177883 U | 11/1985 |
| JP | S62-193784 A | 8/1987 |
| JP | S62-200600 A | 9/1987 |
| JP | H01-295772 A | 11/1989 |

(56) References Cited

FOREIGN PATENT DOCUMENTS

| | | |
|---|---|---|
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO-2018211869 A1 * | 11/2018 ............ B25J 15/024 |

OTHER PUBLICATIONS

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloade Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

(56) References Cited

OTHER PUBLICATIONS

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in A1, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, Sage Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennesse.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magmtic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelber.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport/com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennesse.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS ONE, San Francisco, California.

Siddharth et al., Design and Analysis of a 1-DOF Walking Mechanism, http://siddharthswaminathan.in/files/WalkingMechanism.pdf , Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

Tmsuk, Rescue Robot "T-53" release Control Technologies to Control the Synchronous Operation of the Arm, http://robot.watch.impress.co.jp/cda/news/2007/07/18/864.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

(56) References Cited

OTHER PUBLICATIONS

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

International Search Report for International Application No. PCT/US2019/068998 dated May 20, 2020, 15 pages.

\* cited by examiner

HYBRID ROBOTIC END EFFECTOR

BACKGROUND

Different robotic hands or grippers have been developed for different activities or anticipated usage. For example, magnetic grippers have been developed for ferromagnetic objects, such as sheet metal. Similarly, fingered grippers have been developed for other objects, such as tools. Magnetic grippers cannot effectively grasp tools, while fingered grippers cannot effectively handle some objects, like sheet metal. The development of robotic hands or grippers is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
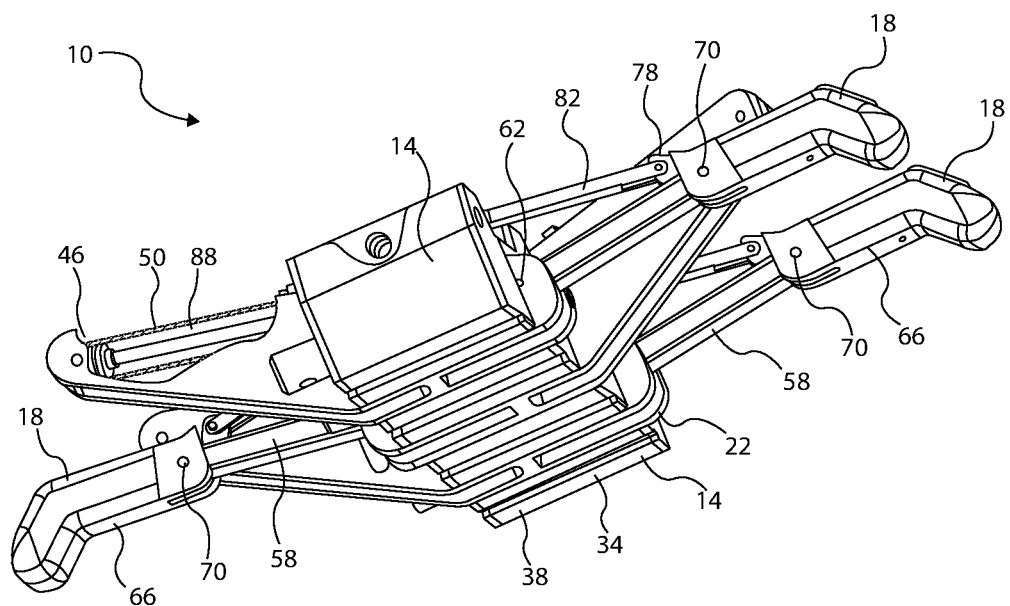
FIG. 1 is a perspective view of a robotic end-effector with both a magnetic gripper and a finger gripper in accordance with an example, and shown with the finger gripper in a retracted configuration and the end-effector in a magnetic configuration.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "ferromagnetic" refers to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic object is attracted to magnets, such as by containing iron, or is a magnet or is magnetic, such as a permanent magnet. As used herein, "magnetic" refers to a material or element that has magnetic properties either inherently, such as with a permanent magnet, or induced, such as with an electromagnet. Magnetic can further refer to a magnet or magnet system or mechanism in which the strength of the magnet is variable, such as with a variable strength magnet.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a robotic end-effector with multiple different types of grippers (hybrid grippers) to more efficiently handle or grasp different types of workpieces or objects without having to change end-effectors or robots. For example, the robotic end-effector can handle or grasp ordinary objects that are not attracted to a magnet, or ferromagnetic objects, such as sheet metal or plates of steel, and other objects, such as tools, which may or may not be ferromagnetic. Thus, the end-effector can be used to grasp objects with its gripper assembly, as well as utilize magnetic properties of the end-effector to assist in gripping or grasping objects that are attracted to magnets. The gripper and magnet can be used simultaneously or separate from one another depending upon the object to ne grasped. The robotic end-effector can have a palm, base or frame with a coupler attachable to a robotic arm or robot. In one aspect, the coupler can be articulated such that the palm can pivot or rotate about the coupler, and thus the robotic arm. In another aspect, the coupler can also comprise power couplings, such as electrical, hydraulic and/or pneumatic couplings or lines to operate the end-effector.

The robotic end-effector can have at least one magnet (or one or more magnets or magnet systems or mechanisms) coupled (meaning coupled either directly or indirectly) to the palm (e.g., a palm made of steel or other metal), with a magnetic face that engages the ferromagnetic object. In addition, the one or more magnetics can define a magnetic engagement surface. The magnet, the palm and the coupler are disposed on a proximal side of the magnetic engagement surface so that the magnetic face forms the outermost contact surface. Thus, the magnetic surface is the outermost contact surface and can contact plate or flat objects without interference.

In addition, the robotic end-effector can have at least one finger pivotally coupled to the palm. The finger can pivot with respect to the palm to oppose the palm, or another finger, to form a gap to grip the object or ferromagnetic object or an other object, such as a tool. Furthermore, the finger can have at least two configurations including a deployed, grip or extended configuration, and a retracted configuration. In the retracted configuration, the finger is disposed proximally with respect to the magnetic engagement surface along with the magnet and the palm. Thus, the magnetic face forms an outermost contact surface to engage the ferromagnetic object, without the finger interfering with the operation or engagement of the magnet and the ferromagnetic object. In the deployed configuration, the finger is disposed distally with respect to the magnetic engagement surface, and opposes the palm or the magnet face, to grip the ferromagnetic object or an other object between the finger and the palm or the magnetic face, and/or another finger.

Figure 2:
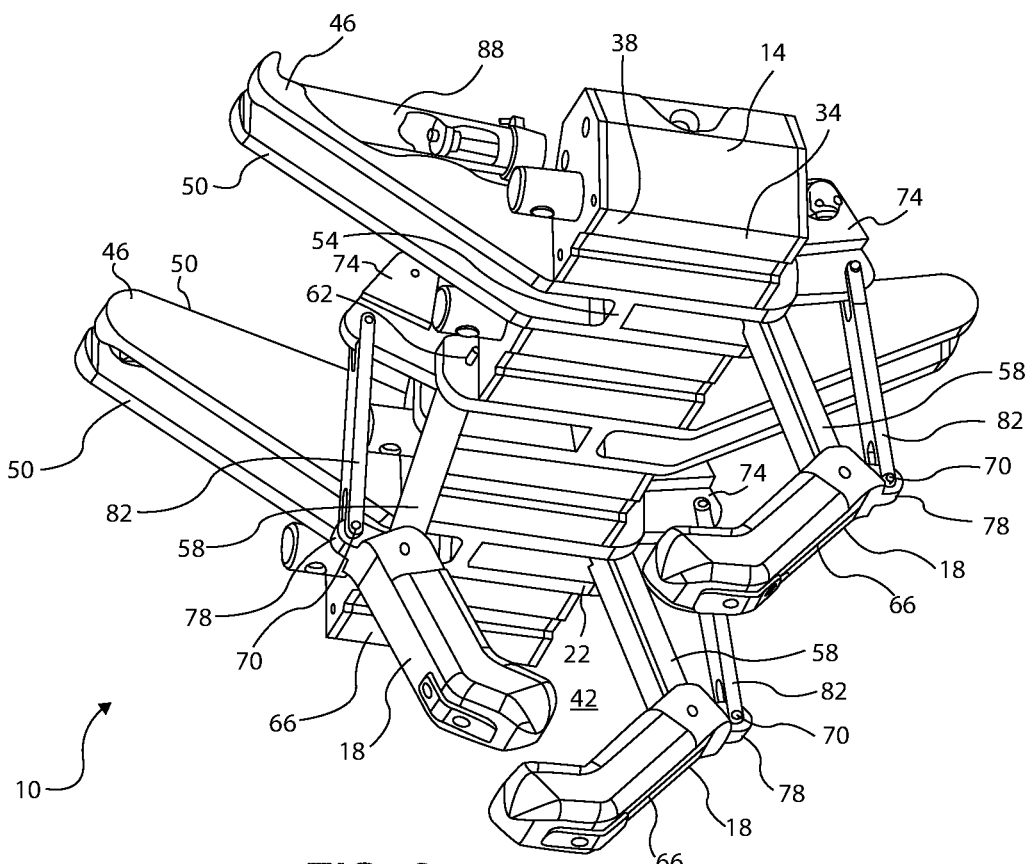
FIG. 2 is a perspective view of the robotic end-effector of FIG. 1 shown with the finger gripper in a deployed or grip configuration and the end-effector in a finger or mechanical grip configuration.
Figure 3:
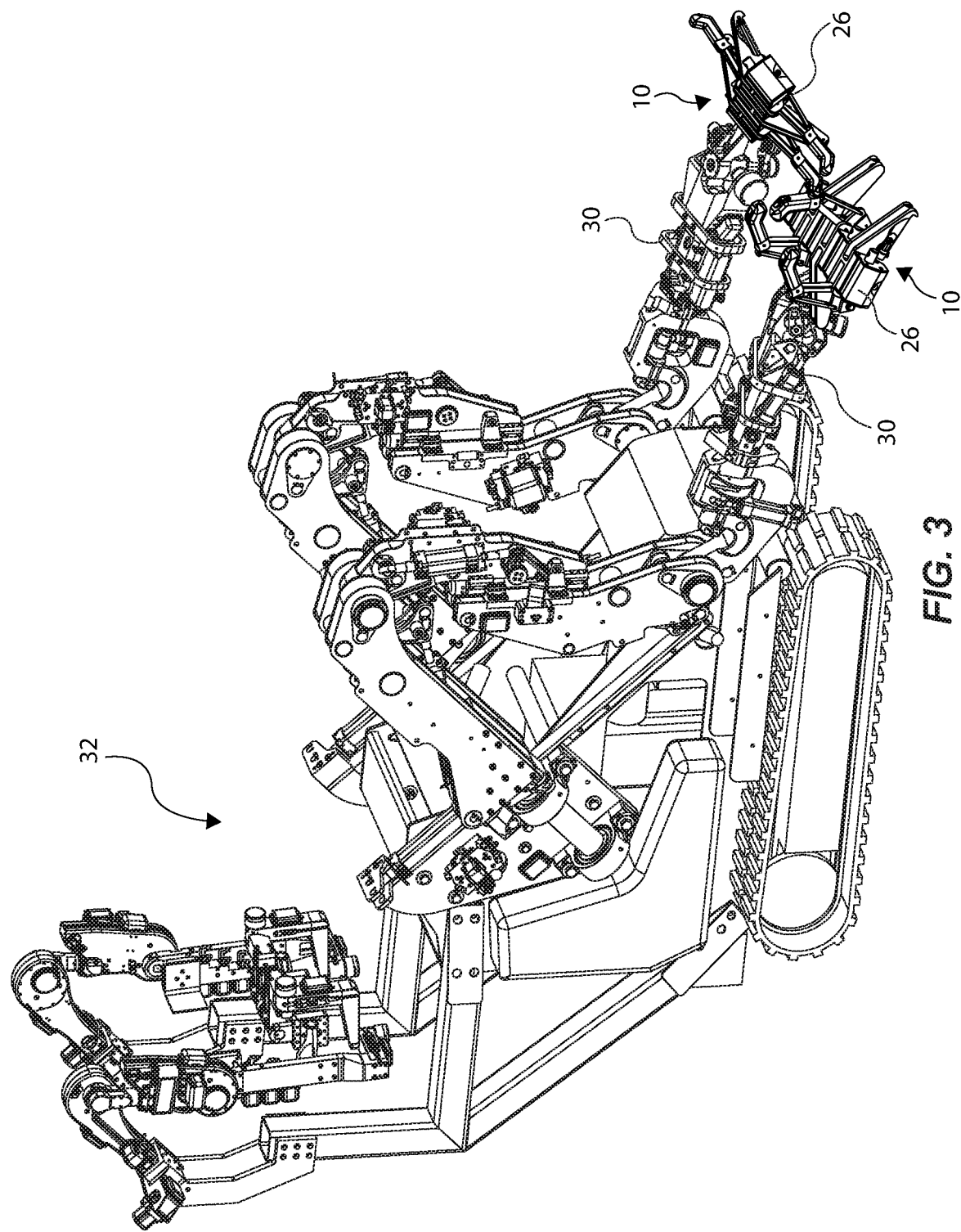
FIG. 3 is a perspective view of a robot utilizing the robotic end-effector of FIG. 1.

FIGS. 1 and 2 depict an example of a robotic end-effector 10 with both magnets 14 and fingers 18, thus otherwise known as a hybrid end effector, with "hybrid" intending to mean or define a single end effector having multiple different types of grasping, gripping or lifting components that can be selected and used to grasp, grip, lift or otherwise secure or move objects. FIG. 1 depicts the end-effector 10 in a magnetic configuration for primarily using the magnets 14 to grip a ferromagnetic object, and with the fingers 18 retracted; while FIG. 2 depicts the end-effector 10 in a finger or mechanical grip configuration for primarily using the fingers 18 to grasp an object, and with the fingers 18 in a deployed, grip or extended configuration. FIG. 3 depicts a robot utilizing one or more end-effectors 10. The end-effector 10 can have a palm, base or frame 22. The palm 22 can have a coupler 26 attachable to a robotic arm 30 of a robot 32. The coupler 26 can be articulated, such that the palm 22 can pivot or rotate about the coupler 26, and thus the robotic arm 30. In another aspect, the coupler 26 can also comprise power couplings, such as electrical, hydraulic and/or pneumatic couplings or lines to operate the end-effector.

In one aspect, the end-effector 10 can have at least one magnet 14. In another aspect, the end-effector 10 can have multiple magnets 14, such as a pair of magnets or an array or series of magnets (e.g., three or more magnets). For example, the end-effector can have an array or series of four magnets 14, as shown. Each magnet 14 can have a magnet face 34 or surface to abut to and magnetically attach to the ferromagnetic object. The magnets 14 can define a magnetic engagement surface 38, which can comprise and define and be formed about a linear plane or in some cases a curved plane. In one aspect, the array of magnets 14 can have magnetic faces 34 that are coplanar, and the array of magnets 14 can together define the magnetic engagement surface 38. The magnet(s) 14, the palm 22 and the coupler 26 can be disposed proximally with respect to the magnetic engagement surface 38. Thus, the magnet face(s) 34 can be exposed, unobstructed, and can form the outermost contact surface for engaging with the ferromagnetic object, such as sheet metal or plates. The magnets 14 can be similar to those described in U.S. Pat. No. 8,892,258, which is hereby incorporated herein by reference. The magnets 14, of the pair of magnets or the array of magnets, can be spaced-apart from one another to create a larger outermost contact surface and to reduce moments between the magnets 14 and the ferromagnetic object. In addition, the array of magnets 14 can be positioned linearly, or in a linear array, as shown. Such a linear configuration can align the magnets 14 to handle narrower objects or pipe. The magnets 14 or the magnet faces 34 thereof can be or can help form at least a portion of the palm 22 or palm face thereof.

In one aspect, the end-effector 10 can have at least one finger 18. In another aspect, the end-effector 10 can have multiple fingers 18, such as a pair of fingers or an array or series of three or more fingers. For example, the end-effector can have an array or series of three fingers 18, as shown. The array of fingers 18 can be positioned in a non-linear matrix.

Each finger 18 can be pivotally coupled to the palm 22, and can pivot to oppose one another and/or the palm 22 or the magnets 14 to grip the ferromagnetic object or an other object in a gap 42 between the fingers 18 and/or the palm 22 or the magnets 14. The fingers 18 are considered to oppose one another even if they are off-set with respect to one another. Thus, one finger 18 can oppose and be off-set with respect to another finger 18 across the gap 42.

In one aspect, at least a portion of at least one finger 18 can be movably disposed between, or linearly aligned between, a pair of spaced-apart magnets 14 so that the finger 18 and the magnets 14 alternate sequentially or can be in an alternating sequence. In another aspect, a pair of fingers 18 can be positioned on opposite side of at least one magnet 14. Again, the fingers 18 and the magnet 14 can alternate sequentially or can be in an alternating sequence. In addition, each of the pair of fingers 18 can be disposed on opposite sides of the palm 22, and can be capable of opposing one another across the gap 42. In another aspect, an array of magnets 14 and an array of fingers 18 can alternate sequentially or can be positioned in an alternating sequence. Thus, a structure of the palm 22 can be used to both carry and interconnect the finger(s) 18 and the magnet(s) 14. In one aspect, the array of magnets 14 can be linear, as shown. Thus, the magnets 14 can be aligned for narrower ferromagnetic objects, such as pipe.

The finger(s) 18 and the end-effector 10 can have at least two configurations, comprising a deployed grip or extended configuration, as shown in FIG. 2, and a retracted configuration, as shown in FIG. 1. In the deployed configuration, the finger(s) 18 are disposed distally with respect to the magnetic engagement surface 38, and oppose one another and the palm 22 or the magnet faces 34. The end-effector 10 and the finger(s) 18 can grip the ferromagnetic object or the other object between the finger(s) 18 and the palm 22 or the magnetic face 34. In the retracted configuration, the finger(s) 18 are disposed proximally with respect to the magnetic engagement surface 38 along with the magnet(s) 14 and the palm 22. The magnetic face(s) 34 form an outermost contact surface for abutting to and magnetically attaching to the ferromagnetic object. The finger(s) 18 are positioned behind the magnetic engagement surface 38, and behind the magnetic face(s) 34, in the retracted configuration so that the finger(s) 18 do not interfere with the ferromagnetic object, such as a large metal plate. Thus, the end-effector 10 can be used to both magnetically grip ferromagnetic objects, and mechanically grip the ferromagnetic objects or other objects or tools. This can occur with both acting together simultaneously at any given time, or this can occur with either one active and the other dormant at any given time. As described above, the array of magnets 14 can be linear, and the array of magnets 14 can be disposed in a profile of the array of fingers 18 in the grip configuration, as shown in FIG. 2. Thus, all of the fingers 18 and all of the magnets 14 can be utilized to grasp an object.

In one aspect, the palm 22 can comprise a frame 46. The frame 46 can be disposed between adjacent magnets 14. Thus, the magnets 14 can be spaced-apart by the frame 46. In addition, a finger 18 can be pivotally coupled to the respective frame 46 between the magnets 14. The palm 22 and the frame 46 can comprise a pair of spaced-apart flanges 50 intercoupled by a web 54. The finger 18 can be pivotally coupled between the pair of spaced-apart flanges 50. The frame 46 can be formed of metal, and can be formed by machining or casting. Other materials, or a composite of materials, are also contemplated, which will be apparent to those skilled in the art.

In another aspect, each finger can comprise a proximal segment or phalange 58 pivotally coupled to the palm 22, frame 46 or flanges 50 at a proximal pivot 62. A distal segment or phalange 66 can be pivotally coupled to the proximal segment 58 at a distal pivot 70. Thus, in one aspect, each finger 18 can comprise two segments or phalanges. In another aspect, each finger can comprise three segments of phalanges. The fingers 18, or the segments 58 and 66 thereof, can be formed of metal, such as by machining or casting, or of plastic, such as by injection molding or 3D printing, or of other materials, or a composite of materials.

The proximal and distal segments 58 and 66 of the finger(s) 18 can have at least two configurations, comprising a straight configuration, as shown in FIG. 1, and a cant configuration, as shown in FIG. 2. Referring to FIG. 2, the cant configuration corresponds to the deployed configuration of the finger(s) 18. In the cant configuration, the proximal and distal segments 58 and 66 are oriented transvers to one another to facilitate gripping an object. Referring to FIG. 1, the straight configuration corresponds to the retracted configuration of the finger(s) 18. In the straight configuration, the proximal and distal segments 58 and 66 are oriented substantially straight or in line with respect to one another. The segments or phalanges of the fingers need not be straight, and can form obtuse angles; but can be oriented relatively straight with respect to one another in the straight configuration, as compared to the cant configuration, and as shown in FIG. 1.

In addition, each finger 18 can further comprises a finger articulation to actuate the finger. The finger articulation can comprise a proximal bellcrank 74 pivotally coupled to the palm 22, the frame 46 or the flanges 50 at the proximal pivot 62. The proximal bellcrank 74 can pivot with respect to the palm 22 along with the proximal segment 58. In addition, the bellcrank 74 can extend from the palm 22 transverse to the proximal segment 58. A tab 78 can extend from the distal segment 66 at the distal pivot 70. The tab 78 can extend transvers with respect to the distal segment 66. In one aspect, the tab 78 and the distal segment 66 can define a distal bellcrank. A proximal link 82 can be pivotally coupled to and between the proximal bellcrank 74 and the tab 78. In addition, the proximal link 82 can be spaced-apart from the proximal segment 58. In one aspect, the proximal segment 58, the proximal link 82, the proximal bellcrank 74, and the tab 78 or the distal bellcrank can form a four-bar linkage. The proximal bellcrank 74 and the proximal link 82 can be formed of metal, such as by machining or casting, or of plastic, such as by injection molding or 3D printing, or of any other material or composite of materials. The tab 78 can be integrally formed with the distal segment 66 as a unitary or monolithic body.

An actuator 86 can be coupled to and carried by the palm 22, the frame 46 or the flanges 50, and pivotally coupled to the proximal bellcrank 74. In one aspect, the actuator 86 can be a pneumatic cylinder. In another aspect, the actuator can be a hydraulic cylinder. In another aspect, the actuator can be an electric motor. The actuator 86 can push and pull the proximal bellcrank 74, which in turn pushes and pulls the proximal link 82; thus causing the proximal and distal segments 58 and 66 to extend and retract, respectively.

In one aspect, the proximal segment 58 can be straight or substantially straight; while the distal segment 66 can be angled, or can have two portions at an obtuse angle with respect to one another to facilitate grasping.

Although the end-effector 10 has been described as having a magnetic configuration primarily relying on the magnets 14 for grasping, and a mechanical configuration primarily relying on the fingers 18 for grasping, both the magnets 14 and the fingers 18 can be used together to both magnetically and mechanically grasp an object in addition to being able to use each one independently.

Figure 4:
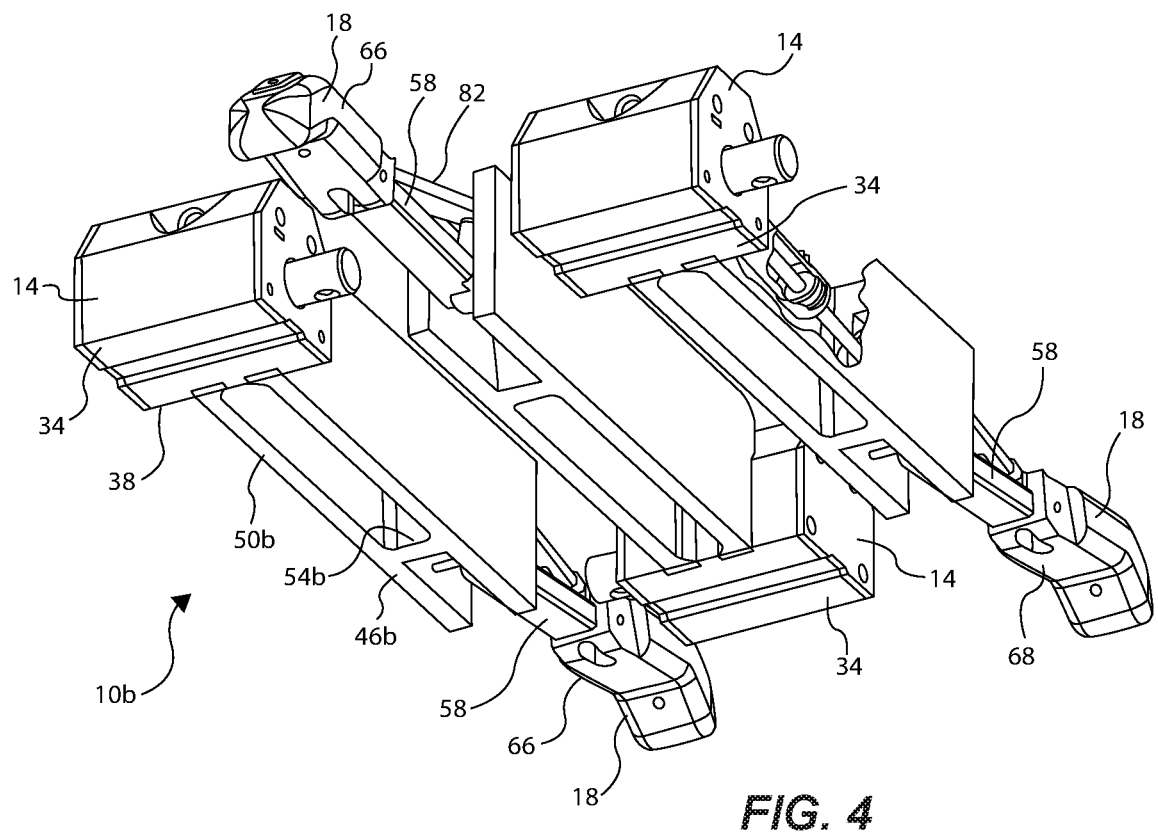
FIG. 4 is a perspective view of another robotic end-effector with both a magnetic gripper and a finger gripper in accordance with an example, and shown with the finger gripper in a retracted configuration and the end-effector in a magnetic configuration.
Figure 5:
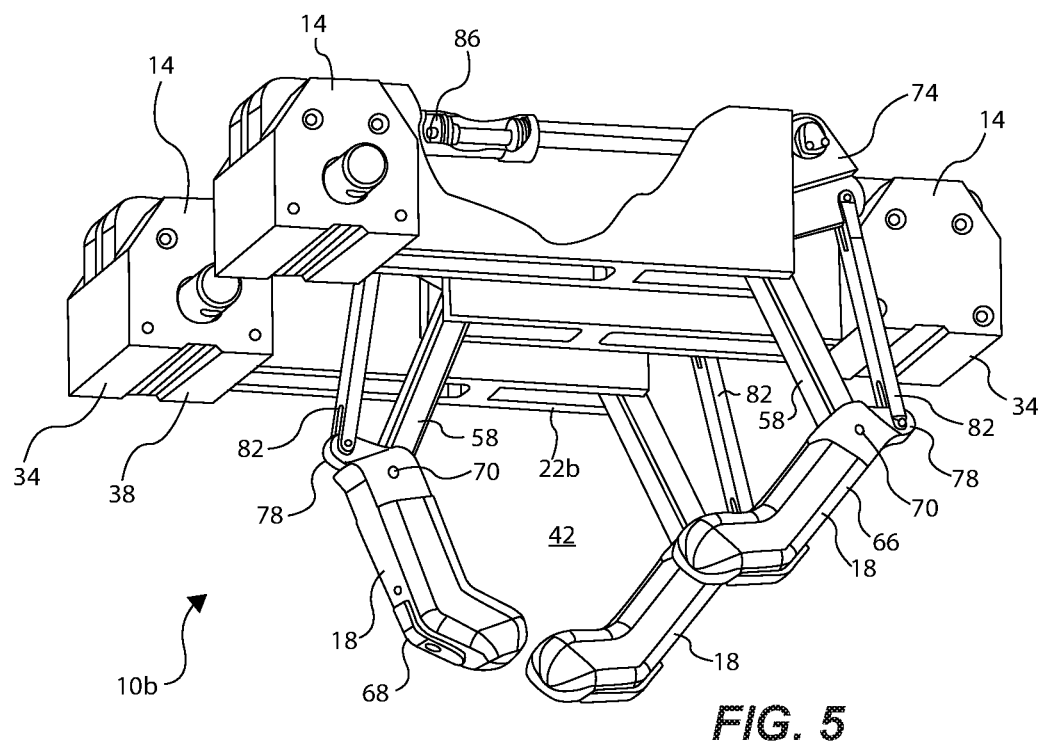
FIG. 5 is a perspective view of the robotic end-effector of FIG. 4 shown with the finger gripper in a deployed or grip configuration and the end-effector in a finger or mechanical grip configuration.

FIGS. 4 and 5 depict another example of a robotic end-effector 10b with both magnets 14 and fingers 18, which is similar in most respects to that described above, and which description is hereby incorporated herein where applicable, as will be recognized by those skilled in the art. FIG. 4 depicts the end-effector 10b in a magnetic configuration for primarily using the magnets 14 to grip a ferromagnetic object, and with the fingers 18 retracted; while FIG. 5 depicts the end-effector 10b in a finger configuration for primarily using the fingers 18 to grasp an object, and with the fingers 18 in a deployed, grip or extended configuration. The array of magnets 14 can be arrayed in a non-linear matrix. The non-linear matrix can reduce moments between the magnets 14 and the ferromagnetic object. The array of fingers 18 can be disposed in a profile of the matrix of magnets 14 in the deployed configuration, and adjacent and/or between magnets 14 in the retracted configuration. The position of the magnets 14 outside of the fingers 18 in the deployed configuration can protect the magnets 14 when gripping an object with the fingers 18. The position of the fingers 18 adjacent the magnets 14 in the retracted configuration can protect the fingers 18.

Again, the palm 22b can comprise a frame 46b. Each finger 18 can be paired with a magnet 14 and intercoupled by the frame 46b. Thus, each magnet 14 can be coupled to the frame 46b and each finger 18 can be pivotally coupled to the frame 46b. It is noted herein that "coupled," as used herein is intended to mean either directly or indirectly coupled. The palm 22b and the frame 46b can comprise a pair of spaced-apart flanges 50b intercoupled by a web 54b. The finger 18 can be pivotally coupled between the pair of spaced-apart flanges 50b.

The magnets described herein can comprise, in one aspect, a variable strength magnet or magnet system or mechanism, such as the one described in U.S. Pat. No. 8,892,258, which is incorporated by reference herein. The variable strength magnet can be actuated to activate a magnetic field (e.g., to grasp an object), and can be deactivated to remove the magnetic field (e.g., such as to facilitate release of the grasped object). With the variable strength magnet, the magnetic end effector is capable of lifting discriminate payloads by selectively varying the strength of the magnetic forces output by the magnetic end effector. For example, the strength of the magnet can be selected to as to grasp a single sheet of steel lying on top of one or more additional steel sheets. The strength would permit grasping the single sheet without lifting any other sheets. Once the sheet is lifted from the stack, the magnetic strength of the magnet can be increased as desired to maintain the grasp on the sheet. An actuator can be operatively coupled to the variable strength magnet end effector, wherein the actuator is selectively actuatable to control the adjustment of the variable strength magnet. The actuator may also be configured to maintain the variable strength magnet at a desired magnetic force output strength once achieved for any given amount of time.

The variable strength magnetic end effector can be in communication with a master control unit designed and operable to control the magnet, and particularly the intensity of the magnet. For example, the master control unit can be used to activate and continuously adjust the magnet. The magnet intensity can be adjusted to an infinite number of output magnetic strengths or magnetic strength output levels. The actuator can be selectively actuatable to control the adjustment of the variable strength magnet, and to maintain the variable strength magnet at a desired magnetic force output strength to secure the object to the end effector. The strength or intensity of the magnetic force is selectively and continuously adjustable throughout a range between full strength and no strength. More particularly, the strength of the magnet may be infinitely adjustable within the given range.

In one specific example, the magnet can comprise a permanent magnet having north and south polar regions. The magnet can be situated in a housing. Within the housing there can be disposed a first and second block of a ferrous material, such as iron. The first and second blocks can be separated by a non-ferrous material, such as brass or aluminum, also disposed within the housing. Extending along in a direction of a plane in the interior of the housing and through the ferrous and non-ferrous material, respectively, a cavity can be formed that is sized and configured to receive the magnet. The strength of the magnetic force of the magnet can be variable depending upon the orientation or position of the magnet, and particularly the north and south polar regions. For example, the position of the magnet, and particularly the north and south polar regions, can be such that the north and south polar regions are positioned in a vertical orientation in line with the non-ferrous material, which functions to turn the magnet off. In this "full off" position, no magnetic force is registered or produced through the magnet. Conversely, orienting the magnet so that the north and south polar regions are horizontal and in line and in contact with the ferrous material causes the magnet to produce a maximum magnetic force or strength output. Orienting the magnet in this "full on" position can be accomplished, for example, by rotating the magnet to be into contact with first and second blocks of the ferrous material.

As indicated above, in one aspect, selectively controlling the rotation of the permanent magnet can be used to selectively increase and decrease the strength or intensity of the magnetic force of the magnet. Specifically, causing the permanent magnet to be positioned in one of an infinite number of positions between the "full on" and "full off" positions can enable a magnetic force of a lesser degree as compared to the permanent magnet's "full on" or full powered position. In these in between positions, the magnetic flux extends partially through the ferrous material and the non-ferrous material to produce a reduced magnetic force. Continuously varying the magnet position between these positions effectively functions to vary the strength of the magnetic force. The position of the magnet can be controlled in a number of ways and via a number of different actuators. In addition, the magnet can be formed of neodymium or samarium cobalt or another material.

Other variable strength magnets that could be incorporated into the end-effector are contemplated herein, and will be apparent to those skilled in the art.

In another example, the magnet can comprise an electromagnet operable to be actuated and deactivated to apply and remove a magnetic field. Types of electromagnets that can be incorporated into the end-effector described herein will be apparent to those skilled in the art. The electromagnet can comprise or be associated with an electronic actuator that delivers current to the electromagnet. In one aspect, the electromagnet can comprise a metal core, such as an iron alloy. A wire coil can be wrapped around the metal core and a current from a power source can be directed to the wire coil. The power source may be any type, such as, but not limited to, a battery.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:
1. A robotic end-effector, comprising:
   a palm;
   one or more magnets coupled to the palm, each of the one or more magnets having a magnet face configured to magnetically attach to a ferromagnetic object, wherein the one or more magnets define a magnetic engagement surface, the palm being disposed on a proximal side of the magnetic engagement surface; and
   at least one finger pivotally coupled to the palm and configured to grip the ferromagnetic object or an other object, the at least one finger having at least two configurations, comprising:
      a deployed configuration in which the at least one finger is disposed distally with respect to the magnetic engagement surface and opposes the palm or the magnet face and is configured to grip the ferromagnetic object or the other object between the at least one finger and the palm or the magnetic face; and a retracted configuration in which the at least one finger is disposed proximally with respect to the magnetic engagement surface along with the at least one magnet and the palm, and in which the magnetic face forms an outermost contact surface, wherein the at least one magnet comprises a pair of magnets spaced-apart from one another and having magnet faces that are coplanar and defining the magnetic engagement surface; and wherein at least a portion of the at least one finger is movably disposable between the pair of magnets.

2. The robotic end-effector of claim 1, wherein the at least one finger comprises a pair of fingers; wherein the pair of fingers is positioned on opposite sides of the at least one magnet.

3. The robotic end-effector of claim 2, wherein the pair of fingers oppose one another in the deployed configuration.

4. The robotic end-effector of claim 1, wherein the at least one magnet comprises an array of magnets spaced-apart from one another and having magnet faces that are coplanar and defining the magnetic engagement surface; wherein the at least one finger comprises an array of fingers; and wherein the arrays of magnets and fingers alternate sequentially.

5. The robotic end-effector of claim 4, wherein the array of magnets is linear.

6. The robotic end-effector of claim 5, wherein the array of magnets is disposed in a profile of the array of fingers in a grip configuration.

7. The robotic end-effector of claim 4, wherein the palm comprises a frame disposed between adjacent magnets; and wherein each finger is pivotally coupled to a respective frame.

8. The robotic end-effector of claim 4, wherein the array of magnets is arrayed in a non-linear matrix.

9. The robotic end-effector of claim 8, wherein the array of fingers is disposed in a profile of the matrix of magnets in the deployed configuration.

10. The robotic end-effector of claim 4, wherein each finger is paired with a magnet; and wherein the palm comprises a frame with the magnet attached thereto and the finger pivotally attached thereto.

11. The robotic end-effector of claim 1, wherein the at least one finger comprises:
 a proximal segment pivotally coupled to the palm at a proximal pivot; and
 a distal segment pivotally coupled to the proximal segment at a distal pivot; and
 wherein the proximal and distal segments of the at least one finger have at least two configurations, comprising:
 a cant configuration corresponding to the deployed configuration of the at least one finger and in which the proximal and distal segments are oriented transverse to one another; and
 a straight configuration corresponding to the retracted configuration of the at least one finger and in which the proximal and distal segments are oriented at least one of straight or substantially straight with respect to one another.

12. The robotic end-effector of claim 11, wherein the at least one finger further comprises a finger articulation comprising:
 a proximal bellcrank pivotally coupled to the palm at the proximal pivot and pivotal with respect to the palm along with the proximal segment, the bellcrank extending from the palm transverse to the proximal segment;
 a tab extending from the distal segment at the distal pivot and transverse to the distal segment, the tab and the distal segment defining a distal bellcrank;
 a proximal link pivotally coupled to and between the proximal bellcrank and the tab, and spaced-apart from the proximal segment; and
 an actuator coupled to the palm and pivotally coupled to the proximal bellcrank.

13. The robotic end-effector of claim 1, wherein the palm comprises a pair of spaced-apart flanges intercoupled by a web; and wherein the at least one finger is pivotally coupled between the pair of spaced-apart flanges.

14. The robotic end-effector of claim 1, further comprising a coupler coupled to the palm and configured to couple the palm to a robotic arm.

15. The robotic end-effector of claim 1, wherein the one or more magnets comprise one or more variable strength magnets.

16. The robotic end-effector of claim 1, wherein the one or more magnets comprise one or more electromagnets.

17. A robotic end-effector, comprising:
 a palm;
 magnets coupled to the palm and having magnet faces configured to magnetically attach to a ferromagnetic object, wherein the magnets define a magnetic engagement surface, the palm and the magnets being disposed on a proximal side of the magnetic engagement surface;
 a pair of fingers pivotally coupled to the palm and configured to grip the ferromagnetic object or an other object, each finger of the pair of fingers being disposed on an opposite side of the palm, and each finger of the pair of fingers being capable of opposing one another; and
 the fingers having at least two configurations, comprising:
 a deployed configuration in which the fingers are disposed distally with respect to the magnetic engagement surface and oppose the palm or the magnet faces and configured to grip the ferromagnetic object or the other object between the fingers and the palm or the magnetic faces; and
 a retracted configuration in which the pair of fingers is disposed proximally with respect to the magnetic engagement surface along with the magnets and the palm, and in which the magnetic faces form an outermost contact surface,
 wherein the magnets and the fingers of the pair of fingers alternate sequentially.

18. The robotic end-effector of claim 17, wherein the magnets comprise an array of magnets arranged in a linear array.

19. The robotic end-effector of claim 18, wherein the array of magnets is disposed in a profile of the pair of fingers in the deployed configuration.

20. The robotic end-effector of claim 17, wherein the palm comprises a frame disposed between adjacent magnets; and wherein each finger of the pair of fingers is pivotally coupled to a respective frame.

21. The robotic end-effector of claim 17, wherein the magnets comprises an array of magnets arranged in a non-linear matrix.

22. The robotic end-effector of claim 21, wherein the pair of fingers is disposed in a profile of the matrix of magnets in the deployed configuration.

23. The robotic end-effector of claim 17, wherein each finger of the pair of fingers is paired with a magnet; and wherein the palm comprises a frame with the magnet attached thereto and each finger of the pair of fingers pivotally attached thereto.

24. The robotic end-effector of claim 17, wherein each finger of the pair of fingers comprises:
at least a proximal segment pivotally coupled to the palm at a proximal pivot; and
a distal segment pivotally coupled to the proximal segment at a distal pivot; and
wherein the proximal and distal segments of the at least one finger have at least two configurations, comprising:
a cant configuration corresponding to the deployed configuration of the pair of fingers and in which the proximal and distal segments are oriented transverse to one another; and
a straight configuration corresponding to the retracted configuration of the pair of fingers and in which the proximal and distal segments are oriented at least one of straight or substantially straight with respect to one another.

25. The robotic end-effector of claim 24, wherein each of the pair of fingers further comprises a finger articulation comprising:
a proximal bellcrank pivotally coupled to the palm at the proximal pivot and pivotal with respect to the palm along with the proximal segment, the bellcrank extending from the palm transverse to the proximal segment;
a tab extending from the distal segment at the distal pivot and transverse to the distal segment, the tab and the distal segment defining a distal bellcrank;
a proximal link pivotally coupled to and between the proximal bellcrank and the tab, and spaced-apart from the proximal segment; and
an actuator coupled to the palm and pivotally coupled to the proximal bellcrank.

26. The robotic end-effector of claim 17, wherein the palm comprises a pair of spaced-apart flanges intercoupled by a web; and wherein each of the pair of fingers is pivotally coupled between the pair of spaced-apart flanges.

27. The robotic end-effector of claim 17, further comprising a coupler coupled to the palm and configured to couple the palm to a robotic arm.

28. A robotic end-effector configured to grasp both ferromagnetic objects and other objects, the robotic end-effector comprising:
a palm configured to be coupled to a robotic arm;
a series of magnets coupled to the palm and having magnet faces configured to magnetically attach to a ferromagnetic object, wherein the series of magnets define a magnetic engagement surface, the palm being disposed on a proximal side of the magnetic engagement surface;
a series of fingers pivotally coupled to the palm and configured to grip the ferromagnetic object or an other object, the series of fingers being arranged in a matrix capable of forming a gap with at least one finger opposing another finger across the gap;
the series of magnets and the series of fingers alternating sequentially; and
the series of fingers having at least two configurations, comprising:
a deployed configuration in which the series of fingers is disposed distally with respect to the magnetic engagement surface opposite the magnet faces and the palm; and
a retracted configuration in which the series of fingers is disposed proximally with respect to the magnetic engagement surface along with the series of magnets and the palm, and in which the magnetic faces form an outermost contact surface.

29. A robotic end-effector, comprising:
a palm;
an array of magnets coupled to the palm, the array of magnets spaced apart from one another and having magnet faces that are coplanar and that are configured to magnetically attach to a ferromagnetic object, wherein the array of magnets define a magnetic engagement surface, the palm being disposed on a proximal side of the magnetic engagement surface; and
an array of fingers coupled to the palm and configured to grip the ferromagnetic object or an other object, the array of fingers alternating sequentially with the array of magnets, and having at least two configurations, comprising:
a deployed configuration in which the array of fingers is disposed distally with respect to the magnetic engagement surface and oppose the palm or the magnet face and are configured to grip the ferromagnetic object or the other object between the array of fingers and the palm or the magnet face; and
a retracted configuration in which the array of fingers is disposed proximally with respect to the magnetic engagement surface along with the array of magnets and the palm, and in which the magnetic face forms an outermost contact surface.

30. A robotic end-effector, comprising:
a palm;
magnets coupled to the palm and having magnet faces configured to magnetically attach to a ferromagnetic object, wherein the magnets define a magnetic engagement surface, the palm and the magnets being disposed on a proximal side of the magnetic engagement surface;
a pair of fingers pivotally coupled to the palm and configured to grip the ferromagnetic object or an other object, each finger of the pair of fingers being disposed on an opposite side of the palm, and each finger of the pair of fingers being capable of opposing one another; and
the fingers having at least two configurations, comprising:
a deployed configuration in which the fingers are disposed distally with respect to the magnetic engagement surface and oppose the palm or the magnet faces and configured to grip the ferromagnetic object or the other object between the fingers and the palm or the magnetic faces; and
a retracted configuration in which the pair of fingers is disposed proximally with respect to the magnetic engagement surface along with the magnets and the palm, and in which the magnetic faces form an outermost contact surface,
wherein each finger of the pair of fingers comprises:
at least a proximal segment pivotally coupled to the palm at a proximal pivot; and
a distal segment pivotally coupled to the proximal segment at a distal pivot,
wherein the proximal and distal segments of the at least one finger have at least two configurations, comprising:
a cant configuration corresponding to the deployed configuration of the pair of fingers and in which the proximal and distal segments are oriented transverse to one another; and
a straight configuration corresponding to the retracted configuration of the pair of fingers and in which the proximal and distal segments are oriented at least one of straight or substantially straight with respect to one another.

\* \* \* \* \*